(12) United States Patent
Lee et al.

(10) Patent No.: US 8,605,233 B2
(45) Date of Patent: Dec. 10, 2013

(54) LIGHT GUIDE PANEL FOR LCD BACK LIGHT UNIT AND LCD BACK LIGHT UNIT THEREBY

(75) Inventors: Seong Hoon Lee, Uiwang-si (KR); Man Suk Kim, Uiwang-si (KR); O Yong Jeong, Uiwang-si (KR); Chul Goo Chi, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 922 days.

(21) Appl. No.: 12/659,327

(22) Filed: Mar. 4, 2010

(65) Prior Publication Data

US 2010/0165254 A1 Jul. 1, 2010

Related U.S. Application Data

(63) Continuation of application No. PCT/KR2007/005974, filed on Nov. 26, 2007.

(30) Foreign Application Priority Data

Sep. 5, 2007 (KR) .................. 10-2007-0090179

(51) Int. Cl.
 *G02F 1/1335* (2006.01)
(52) U.S. Cl.
 USPC .......................................................... 349/65

(58) Field of Classification Search
 USPC .......................................................... 349/65
 See application file for complete search history.

(56) References Cited

U.S. PATENT DOCUMENTS

| 6,185,357 B1 | 2/2001 | Zou et al. | |
| 7,054,068 B2 * | 5/2006 | Yoshida et al. | 359/624 |
| 7,663,713 B2 * | 2/2010 | Saito et al. | 349/65 |

FOREIGN PATENT DOCUMENTS

| JP | 2006-040710 A | 2/2006 |
| JP | 2006-196384 A | 7/2006 |
| KR | 10-2006-0059818 A | 6/2006 |
| KR | 10-2007-0067356 A | 6/2007 |
| TW | 2005-27016 | 8/2005 |

OTHER PUBLICATIONS

Taiwanese Office Action in TW 096144898, dated Dec. 8, 2011 (Lee, et al.).

* cited by examiner

*Primary Examiner* — James Dudek
(74) *Attorney, Agent, or Firm* — Lee & Morse, P.C.

(57) ABSTRACT

A light guide plate for an LCD back light unit has a rear surface formed with a main prism portion including a plurality of prisms, and a front surface formed with a front-lens part including a plurality of optical members such as lenticular lenses or microlenses so as to improve visibility of a predetermined pattern of the main prism part, and a liquid crystal display device using the light guide plate.

20 Claims, 6 Drawing Sheets

LIGHT GUIDE PANEL FOR LCD BACK LIGHT UNIT AND LCD BACK LIGHT UNIT THEREBY

CROSS-REFERENCE TO RELATED APPLICATION

This application is a continuation of pending International Application No. PCT/KR2007/005974, entitled "Light Guide Panel for LCD Back Light Unit and LCD Back Light Unit Thereby," which was filed on Nov. 26, 2007, the entire contents of which are hereby incorporated by reference.

BACKGROUND

1. Technical Field

Embodiments of the present invention relate to a light guide plate for a back light unit of a liquid crystal display (hereinafter, referred to simply as a "LCD") device. More specifically, embodiments of the present invention relate to a light guide plate for an LCD back light unit, wherein the light guide plate has a rear surface formed with a main prism portion including a plurality of prisms, and a front surface formed with a front-lens part including a plurality of optical members such as lenticular lenses or microlenses, so as to improve visibility of a predetermined pattern of the main prism part.

2. Background Art

In general, an LCD device refers to a device which displays numerals or images through application of an electric field to liquid crystals disposed between two glass substrates, in which the liquid crystals are made of a material having an intermediate phase between a liquid and a solid.

Since the LCD device is not a self-luminescent device, it must be provided with a back light unit as a light source to generate light. An image is displayed in such a manner that transmittance of light generated from the back light unit is adjusted in a liquid crystal panel, in which liquid crystals are uniformly arranged.

According to a position of a light source that emits light, an LCD back light unit is classified to a direct-type back light unit in which the light source is directly positioned at a rear side of a liquid crystal panel of LCD, and an edge-type back light unit in which the light source is positioned at a side of the liquid crystal panel of LCD. According to a shape of a light guide plate, the edge-type back light unit is sub-classified to a wedge-type back light unit and a flat-type back light unit.

FIG. 8 is a view illustrating the structure of a conventional back light unit using a wedge-type light guide plate.

A light source 2 serves to emanate light initially in the LCD device. Although various types of light source can be used, the LCD device generally employs a cold cathode fluorescence lamp (CCFL) which involves low power consumption and emits highly bright white light.

A light guide plate 4 is provided below the rear side of an LCD panel and at one side of the light source 2 and serves to convert spot light generated from the light source 2 into plane light and thus project the plane light forward to the LCD panel.

A reflection plate 3 is arranged on a rear side of the light guide plate 4, and serves to reflect light emitted from the light source 2 toward the LCD panel disposed in front of the reflection plate 3.

The diffusion sheet 5 is arranged on a front side of the light guide plate 4, and serves to make uniform light passing through the light guide plate 4.

While the light passes through the diffusion sheet 5, diffusion of light occurs in horizontal and vertical directions so that brightness is rapidly deteriorated. In this regard, prism sheets 6 are used to reflect and concentrate the light, thereby providing enhanced brightness.

A protective sheet 7 is arranged above the prism sheets 6, and serves to prevent scratches on the prism sheet 6, and to prevent Moire effect from occurring when using the prism sheets 6 arranged in two layers in the horizontal and vertical directions.

The back light unit further includes a mold frame (housing) that serves as a case to allow respective components of the back light unit to be fixed so that the back light unit can be integrated, and a lamp cover (back cover) to protect the back light unit while serving to maintain the strength of the back light unit and support the back light unit.

As shown in FIG. 8, the light source 2 is generally located at one edge of the back light unit (for an LCD TV, the light source is often located directly at the rear side of a panel). As a result, light is not uniformly transmitted through the overall surface of the unit, so that the edge of the back light unit can be brighter than any other portions of the back light unit. In order to prevent this phenomenon, the light guide plate 4 is used. The light guide plate is generally made of a transparent acrylic resin, which is not easily breakable due to its high strength, and has deformation resistance, light weight and high transmittance of visible light.

In other words, the light guide plate 4 serves to allow light emitted from the light source 2 to be uniformly projected to the overall surface of the light guide plate 4. In practice, however, in a case where the back light unit is disassembled and light is allowed to emit from the light source 2 located at one side of the light guide plate 4, the light is not uniformly projected to the overall surface of the light guide plate 4, but is concentrated on both ends of the light guide plate 4. This is because the light guide plate 4 guides the light from the light source 2 to the opposite side of the light guide plate 4.

Thus, the rear surface of the light guide plate 4 is subjected to a specific treatment to cause scattered reflection of light in the light guide plate 4 such that light can be transmitted through the overall surface of the light guide plate 4. Specifically, the rear surface of the light guide plate 4 is formed with a prominence/depression pattern which has a predetermined shape designed in consideration of a distance from the light source 2 and the like. When the prominence/depression pattern is formed on the rear surface of the light guide plate 4, plane light having higher brightness and uniformity is emitted through the overall surface of the light guide panel of the LCD device.

However, in the conventional LCD device constructed as above, a portion of the panel with the prominence/depression pattern formed therebelow looks bright, and the other portions of the panel without having the prominence/depression pattern therebelow looks dark, so that there occurs a spot phenomenon on the panel, thereby deteriorating the visibility of the LCD device. In particular, as the LCD panel is increased in size, a region separated a far distance from the light source 2 lacks in absolute amount of light reaching there, and looks dark.

In addition, the diffusion sheet and the prism sheets are used for improvement of light uniformity, and cause an increase in manufacturing costs of the back light unit.

In order to solve the above problems, there is a need for a great deal more research to obtain plane light with excellent visibility, high brightness and good uniformity over the entire surface of the LCD panel without using the diffusion sheet or the prism sheets.

SUMMARY

Embodiments of the present invention are directed to solving the foregoing problems of the prior art. Is one aspect of an embodiment of the present invention to provide a light guide plate for an LCD back light unit which can provide plane light having high brightness and uniformity over the entire surface of the LCD panel.

It is another aspect of an embodiment of the present invention to provide an LCD back light unit using the light guide plate.

In accordance with one aspect of an embodiment of the present invention, there is provided a light guide plate for a liquid crystal display device, comprising: side surfaces on which light is incident, a front surface from which the light is emitted; the front surface connected to the side surfaces; and a rear surface on which the light is reflected, wherein the rear surface is formed with a main prism portion, including a plurality of prisms, each having a longitudinal direction perpendicular to a direction of light emitted from a light source, and the front surface is formed with a front-lens part, including a plurality of optical members, each having an oval cross-section.

The light guide plate for the liquid crystal display device according to an embodiment of the present invention enables a uniform increase in amount of light reaching an overall surface of a panel of the liquid crystal display device, and contributes to improvement in the visibility of a stripe- or dot-pattern of a main prism part disposed on the rear surface of the panel thereof. The brightness and visibility of the light guide plate according to an embodiment of the present invention are significantly improved, in comparison to a conventional light guide plate in which prisms are disposed on a front surface thereof.

Thus, according to embodiments of the present invention, since the back light unit can be realized without one or both of a diffusion sheet and a prism sheet, it is possible to reduce manufacturing costs of the back light unit.

BRIEF DESCRIPTION OF THE DRAWINGS

The above and other aspects, features and other advantages will be more clearly understood from the following detailed description taken in conjunction with the accompanying drawings, in which.

DETAILED DESCRIPTION

Figure 1:
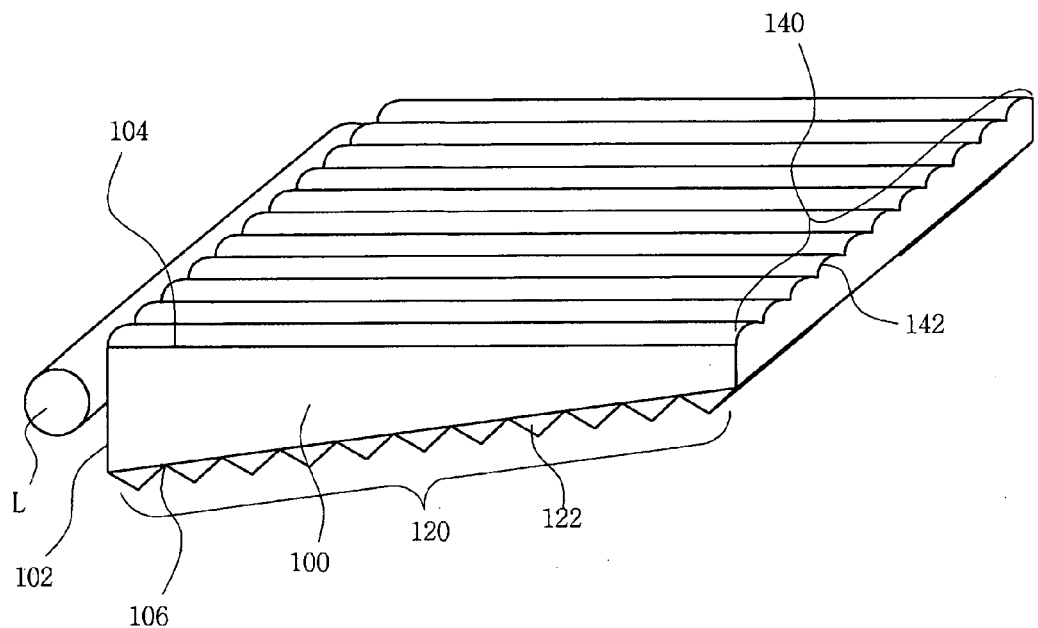
FIGS. 1 and 2 are perspective views illustrating a light guide plate for an LCD back light unit according to a first embodiment of the present invention, when viewed from slightly different angles.

Korean Patent Application No. 10-2007-0090179, filed on Sep. 5, 2007, in the Korean Intellectual Property Office, and entitled: "Light Guide Panel for LCD Back Light Unit and LCD Back Light Unit Thereby," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. Like reference numerals refer to like elements throughout.

Embodiments of the present invention are directed to a light guide plate for a liquid crystal display device, comprising: side surfaces on which light is incident, a front surface from which the light is emitted, the front surface connected to the side surfaces, and a rear surface on which the light is reflected, wherein the rear surface is formed with a main prism portion, including a plurality of prisms, each having a longitudinal direction perpendicular to a direction of light emitted from a light source, and the front surface is formed with a front-lens part, including a plurality of optical members, each having an oval cross-section.

Embodiments of the present invention will now be described with reference to the accompanying drawings in greater detail.

Figure 2:
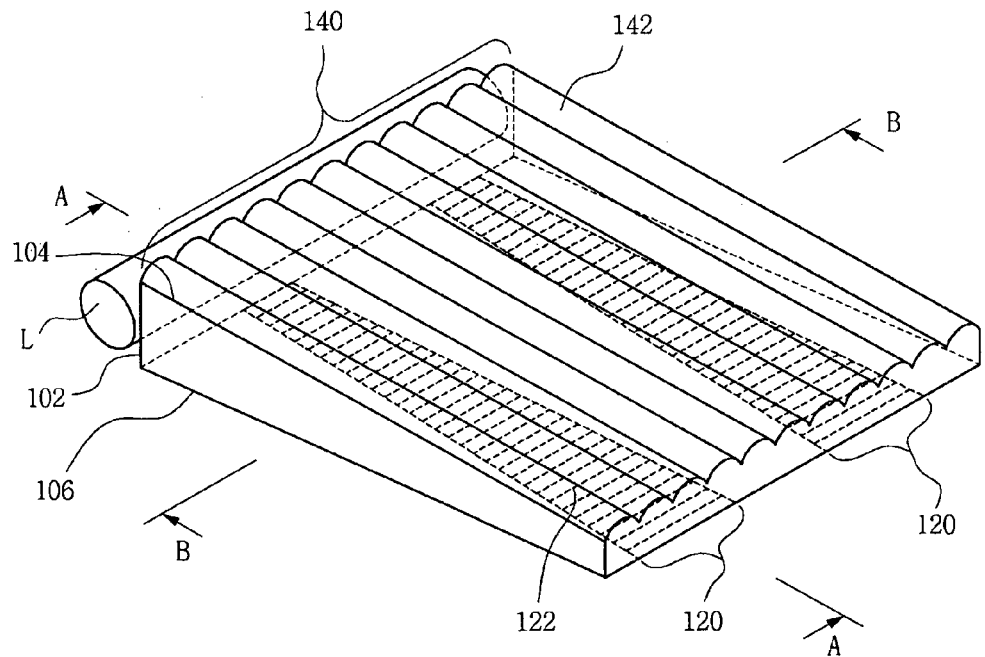

FIGS. 1 and 2 are perspective views illustrating a light guide plate for an LCD back light unit according to a first embodiment of the present invention, when viewed from different angles.

The first embodiment of the present invention is directed to a wedge-type light guide plate in which a light source L is located at one side thereof. The light guide plate is generally made of a transparent acrylic resin, which has high strength, break and deformation resistances, light weight and high transmittance of visible light.

Referring to FIG. 1, the light guide plate comprises a body 100 which comprises side surfaces 102, on which light is incident, a front surface 104, from which the light is emitted, wherein the front surface 104 is connected to the side surfaces 102 while facing a panel (not shown) of the LCD device, and a rear surface 106, on which the light is reflected, wherein the rear surface 106 faces the front surface 104.

Unlike a dictionary's definition, the side surfaces 102 are defined as surfaces on which light is incident. Thus, in FIG. 1, the side surfaces 102 refer to two surfaces adjacent to the light source L.

A main prism part 120 is formed on the rear surface 106 and includes a plurality of prisms, each having a longitudinal direction perpendicular to a direction of light emitted from the light sources.

The main prism part 120 makes uniform the brightness of the front surface 104 of the light guide plate. As shown in FIG. 1, in the case where a wedge-type light guide plate in which a light source L is located at one side thereof, the main prism part 120 has an increased width w along with an increase in distance from the side surface 102 on which light is incident. The reason for the increased width w is as follows. As a distance from the side surface 102 on which light is incident increases, an amount of light reaching there becomes smaller. In this regard, since the prisms 120, which serve to reflect and refract light, have a larger length, in spite of a small amount of light reaching the prisms 120, an amount of light reflected or refracted by the prisms 120 is increased, so that uniformity of light emitted toward the front surface 104 can be improved.

Figure 5:
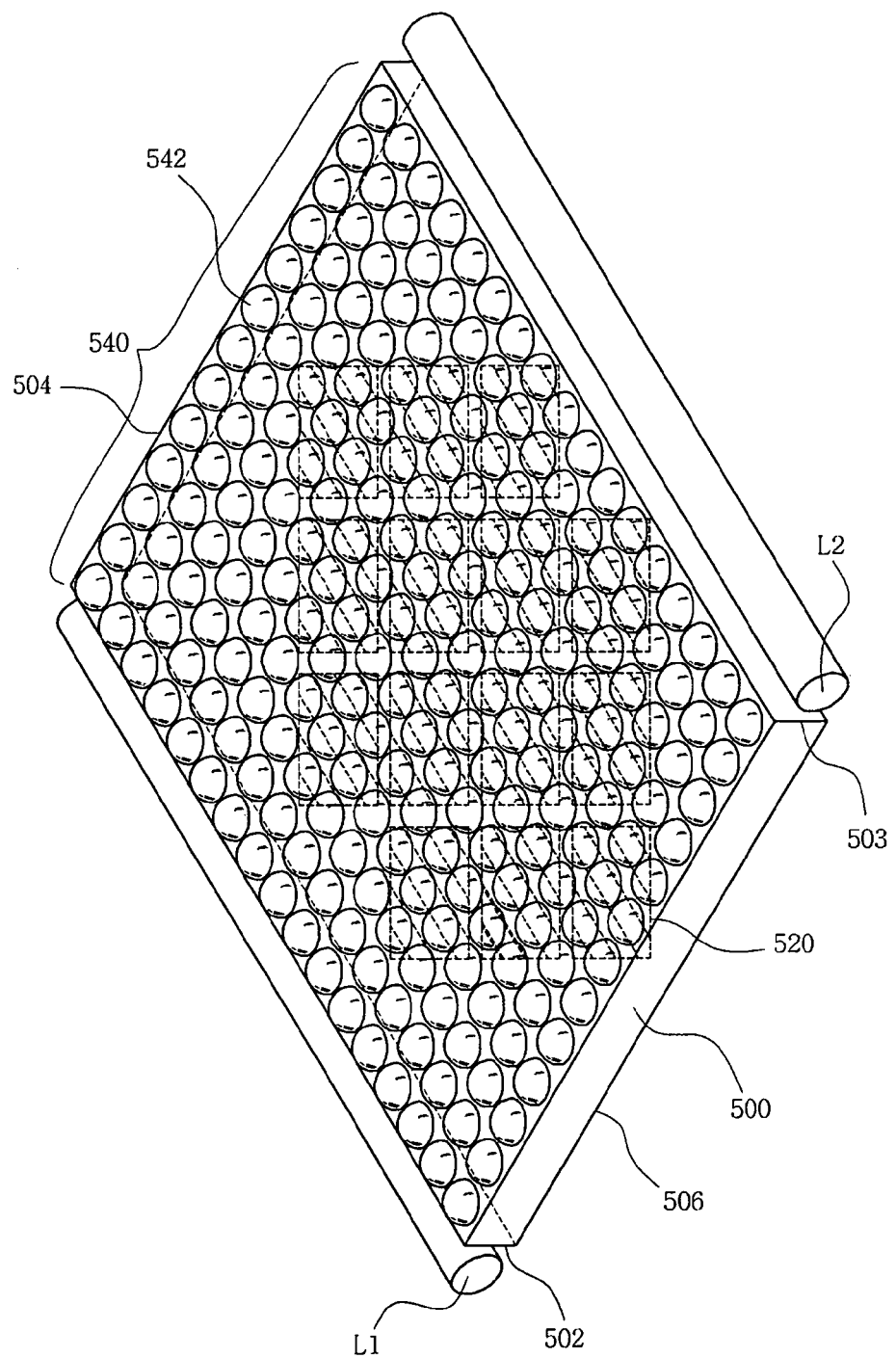
FIG. 5 is a perspective view illustrating a light guide plate for an LCD back light unit according to a second embodiment of the present invention.

As shown in FIG. 1, the main prism part 120 may have a stripe pattern in which a width is varied along with a distance from the light source. Alternatively, the main prism part 120 may have a dot pattern, as shown in FIG. 5.

The front surface 104 is formed with a front lens part 140 composed of optical members 142, each of which has a half-oval cross-section. The front lens part 140 serves to improve optical properties and visibility. Preferably, each of the optical members 142 has a pitch of 10 to 250 µm.

A conventional light guide plate has a smooth surface without any optical member, or has prisms with a triangular cross-section.

However, in the conventional light guide plate, the main prism part formed on the rear surface of the light guide plate is exposed when viewed from the front surface thereof, and the pattern of the main prism part is thus visible. Such a phenomenon results in interference fringe between the pattern of the main prism part and a basic pattern of an upper panel of the back light unit, thus disadvantageously causing Moire effect.

On the other hand, according to the light guide plate of an embodiment of the present invention, the front lens part 140 composed of optical members 142, which have a half-oval cross-section is provided on the front surface 104 of the light guide plate and thus covers the main prism part 120, thereby relieving the visibility of the pattern of the main prism part 120, reducing interference fringe between the pattern of the main prism part 120 and the pattern of the upper panel and improving optical properties.

Figure 3:
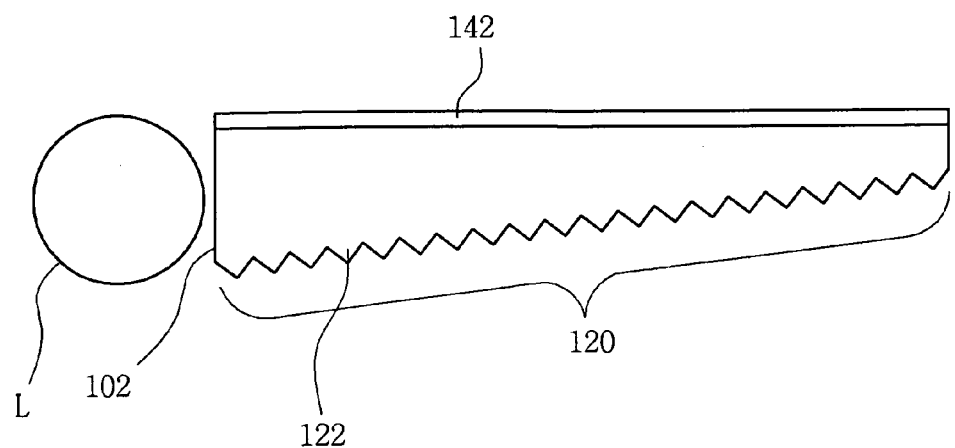
FIG. 3 is a sectional view taken along the line A-A in FIG. 2.
Figure 4:
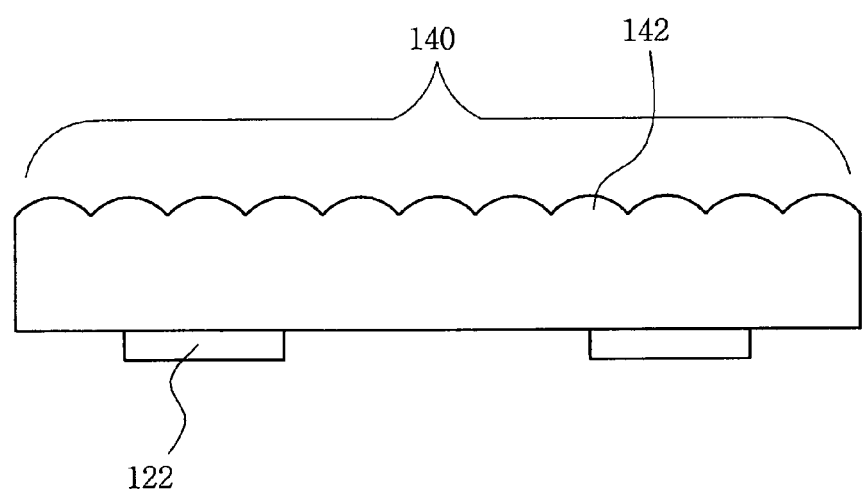
FIG. 4 is a sectional view taken along the line B-B in FIG. 2.

FIG. 3 is a sectional view taken along the line A-A in FIG. 2. FIG. 4 is a sectional view taken along the line B-B in FIG. 2.

As can be seen from FIG. 3 which shows the cross-section of the light guide plate taken perpendicularly to the longitudinal direction of the light source, optical members 142 are formed along the longitudinal direction of the cross-section on the front surface of the light guide plate. Since the optical members 142 herein used are lenticular lenses, the longitudinal direction of each lenticular lens is the same as that of the cross-section. In other words, the longitudinal direction of the lenticular lens is parallel with the direction of light.

As can be seen from FIG. 4 which shows the cross-section of the light guide plate parallel to the longitudinal direction of the light source, the optical members 142 disposed on the front surface of the light guide plate have an oval cross-section and the prisms 122 are spaced apart from each other on the rear surface of the light guide plate.

The prisms 122 increase in length along with an increase in a distance from distance from the light source.

An angle defined between the longitudinal direction of each prism and the longitudinal direction of each lenticular lens is preferably in the range of 80 to 100°, and most preferably 90°.

FIG. 5 is a perspective view illustrating a light guide plate for an LCD back light unit according to a second embodiment of the present invention.

The second embodiment of the present invention is directed to a flat-type light guide plate in which light sources L1 and L2 are located at both sides thereof, respectively. The flat-type light guide plate includes a main prism part 520 formed with a dot-pattern and a front lens part 540 which includes a plurality of microlenses 542.

According to the second embodiment, the main prism part 520 has a dot-pattern. Alternatively, the main prism part 520 may have a stripe-pattern, which is the same pattern as in the first embodiment of the present invention.

In the case where the main prism part 520 has a dot-pattern, the dot-pattern increases in density along with an increase in a distance from the light source. The reason for this characteristic on the dot-pattern is the same as in the case of the stripe-pattern that increases in width with a distance from the light source. That is to say, the characteristic of the dot-pattern increases an amount of light reflected/refracted by prisms far from the light source, thereby improving overall uniformity of light.

According to the second embodiment shown in FIG. 5, the microlenses 542 constitute the front lens part 540. The microlenses 542 are in the shape of a bulging hemisphere. Since the microlenses 542 have a continuously curved surface, like the lenticular lenses, it covers the dot-pattern of the main prism part 520 and brings about improvement in optical properties.

Hereinafter, the fact that the use of the light guide plate according to preferred embodiments of the present invention causes improvement in optical properties, e.g., brightness, uniformity and visibility will be illustrated with reference to the following specific Examples. Although not mentioned herein, a more detail of Examples will be appreciated by those skilled in the art.

The advantages and effects of embodiments of the present invention will be demonstrated from Examples as below. The following Examples and Comparative Examples are provided in order to set forth particular details of one or more embodiments. However, it will be understood that the embodiments are not limited to the particular details described.

EXAMPLES

1. Experimental and Comparative Examples

Figure 6:
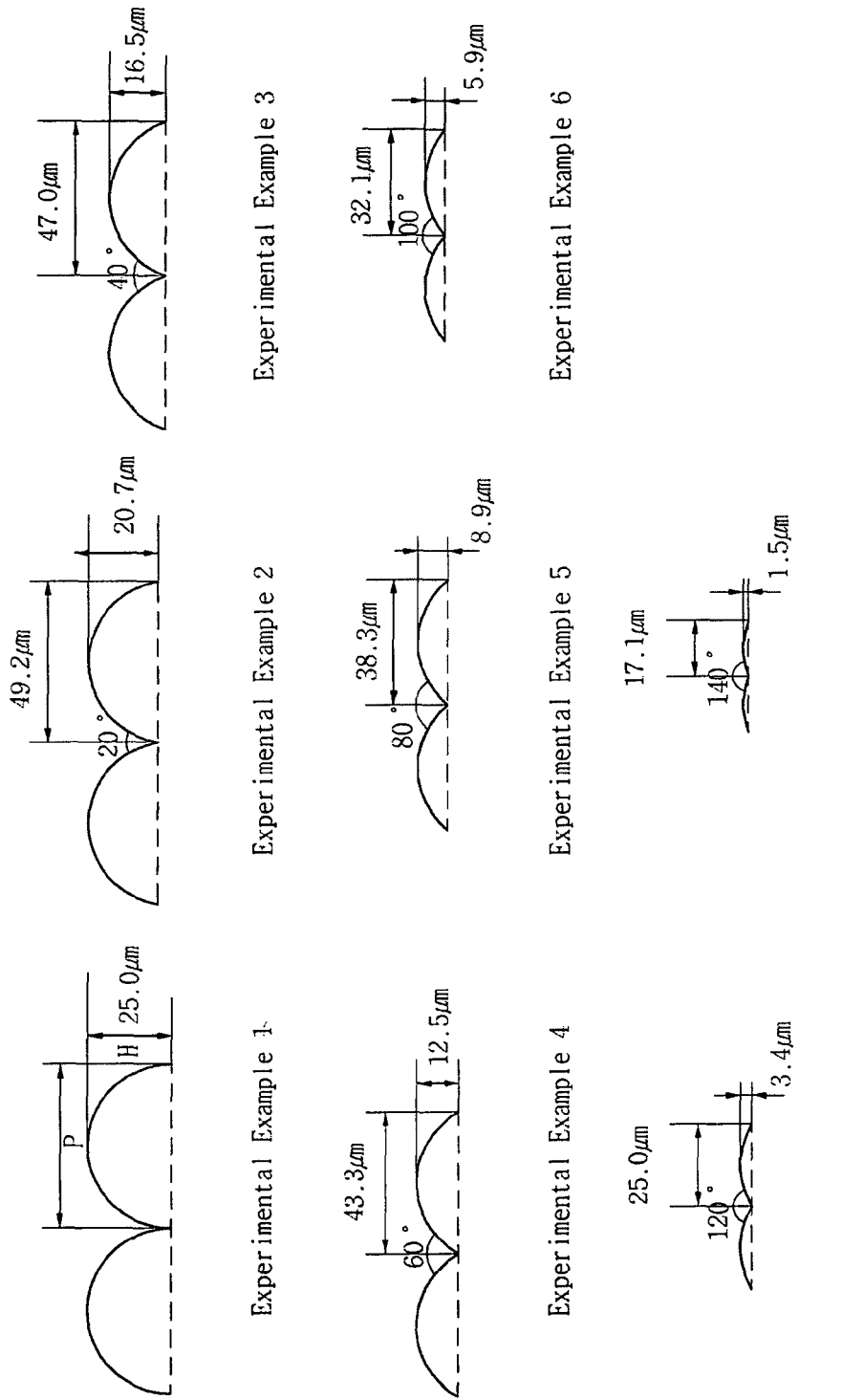
FIG. 6 is a sectional view illustrating specific dimensions of an optical member in the form of a lenticular lens formed on the front surface of a light guide plate for a back light unit of a liquid crystal display device according to an embodiment of the present invention.

FIG. 6 is sectional views illustrating specific dimensions of each optical member in the form of a lenticular lens formed on the front surface of a light guide plate for a back light unit of an LCD device according to Experimental Example of an embodiment of the present invention.

The respective lenticular lenses have a uniform curvature radius of 25 µm and vary in a height H, a pitch P and an angle between the adjacent lenses.

The variable dimensions are based on the angle, and the height H and the pitch P depend upon variable angles of 0°, 20°, 40°, 60°, 80°, 100°, 120° and 140°.

Table 1 shows specific dimensions of respective lenticular lenses according to Experimental Examples.

Experimental Example 1

A main prism part [width W×length L×thickness T=288.8×217.7×2.4 (start)×0.8 (end) mm] was formed with a stripe pattern (pitch: 430 µm) of prisms (height: 14.25 µm; pitch: 25 µm; and internal angle: 82.5°) on the rear surface of a wedge-type light guide plate. In addition, lenticular lenses were disposed perpendicular to the light source on the front surface of the light guide plate, each of which has an oval cross-section with a curvature radius R of 25 µm, a height of 25 µm and a pitch of 50 µm and an angle between the adjacent lenses of 0°.

Experimental Examples 2 to 8

Experimental Examples 2 to 8 were performed in the same manner as in Experimental Example 1 except that the angle between adjacent lenticular lenses formed on the front surface of the light guide plate were varied by 20° from 20° to 140°, and the height and pitch of the lenticular lenses were determined by the angle. The specific dimensions of the lenticular lenses in Experimental Examples 1 to 8 were summarized in Table 1 below.

TABLE 1

|  | Exp. Ex. 1 | Exp. Ex. 2 | Exp. Ex. 3 | Exp. Ex. 4 | Exp. Ex. 5 | Exp. Ex. 6 | Exp. Ex. 7 | Exp. Ex. 8 |
|---|---|---|---|---|---|---|---|---|
| Curvature radius | 25.0 μm | 25.0 μm | 25.0 μm | 25.0 μm | 25.0 μm | 25.0 μm | 25.0 μm | 25.0 μm |
| Lens height | 25.0 μm | 20.7 μm | 16.5 μm | 12.5 μm | 8.9 μm | 5.9 μm | 3.4 μm | 1.5 μm |
| Lens pitch | 50.0 μm | 49.2 μm | 47.0 μm | 43.3 μm | 38.3 μm | 32.1 μm | 25.0 μm | 17.1 μm |
| Angle | 0° | 20° | 40° | 60° | 80° | 100° | 120° | 140° |

Comparative Example 1

A main prism part [width W×length L×thickness T=288.8×217.7×2.4 (start)×0.8 (end) mm] was formed with a stripe pattern (pitch: 430 μm) of prisms (height: 14.25 μm; pitch: 25 μm; and internal angle: 82.5°) on the rear surface of a wedge-type light guide plate.

The wedge-type light guide plate was provided with a smooth front surface.

Comparative Example 2

A main prism part [width W×length L×thickness T=288.8×217.7×2.4 (start)×0.8 (end) mm] was formed with a stripe pattern (pitch: 430 μm) of prisms (height: 14.25 μm; pitch: 25 μm; and internal angle: 82.5°) on the rear surface of a wedge-type light guide plate.

In addition, prisms were disposed perpendicular to the light source on the front surface of the light guide plate, each of which has a cross-section with a pitch of 50 μm, a height of 25 μm, and an angle between the adjacent lenses of 90°.

2. Result Analysis

TABLE 2

|  | Comp. Ex. 1 | Comp. Ex. 2 | Exp. Ex. 1 | Exp. Ex. 2 | Exp. Ex. 3 | Exp. Ex. 4 | Exp. Ex. 5 | Exp. Ex. 6 | Exp. Ex. 7 | Exp. Ex. 8 |
|---|---|---|---|---|---|---|---|---|---|---|
| Structure of top | X | Prism | Lenticular lens | Lenticular lens | Lenticular lens | Lenticular lens | Lenticular lens | Lenticular lens | Lenticular lens | Lenticular lens |
| Vertical brightness (cd) | 224.5 | 234.93 | 215.6 | 199.9 | 216.4 | 225.4 | 241.5 | 247.1 | 256.3 | 256.7 |
| Visibility of pattern | 1 | 1 | 4 | 4 | 4 | 3 | 3 | 3 | 2 | 2 |
| Lens height/ lens pitch | — | — | 0.5 | 0.42 | 0.35 | 0.29 | 0.23 | 0.18 | 0.16 | 0.09 |

Grade on Visibility of Pattern: Excellent (5) > Very Good (4) > Good (3) > Not Bad (2) > Bad (1)

Figure 7:
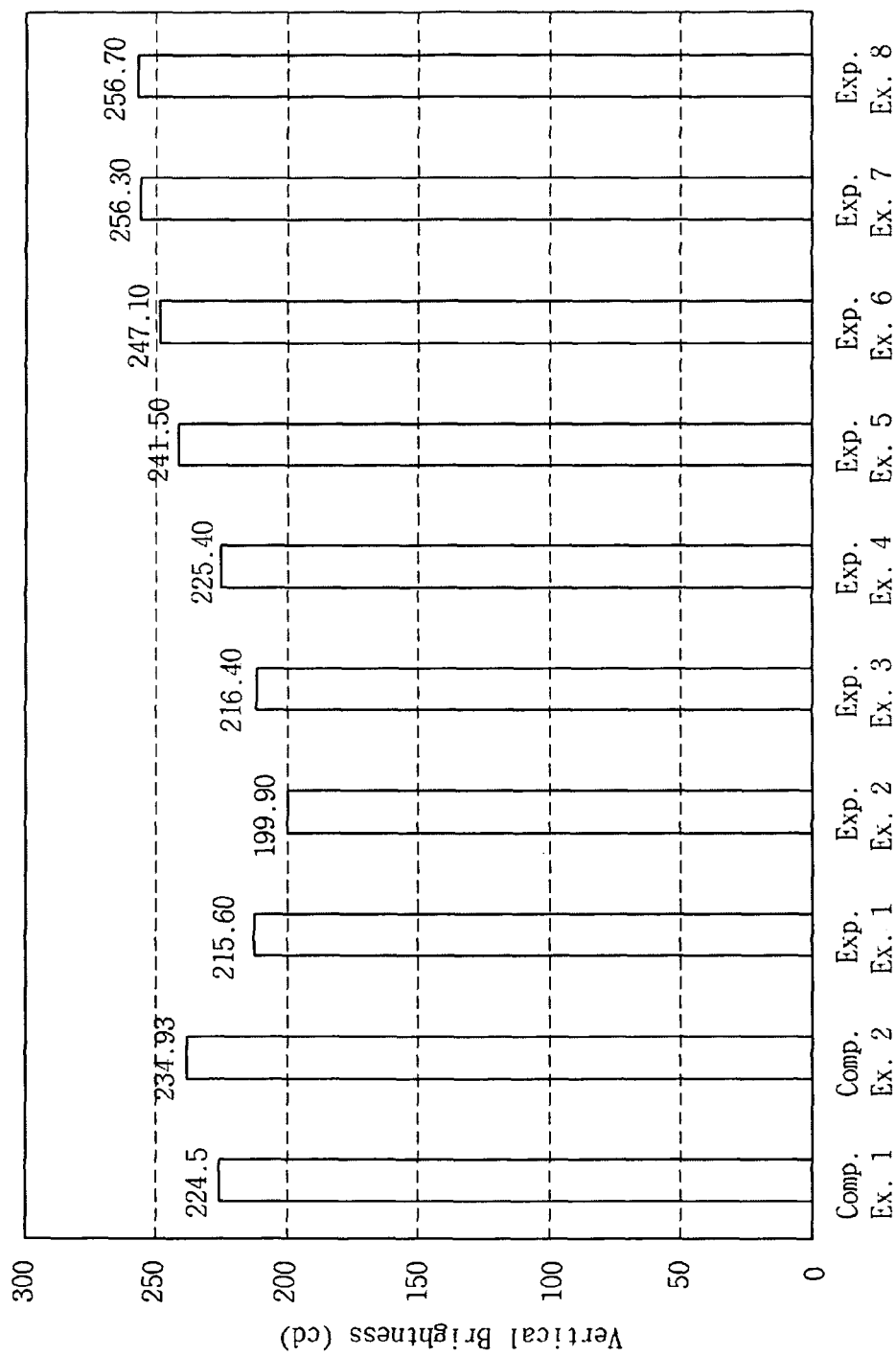
FIG. 7 is a graph showing the brightness of LCD devices in Experimental and Comparative Examples of embodiments of the present invention.
Figure 8:
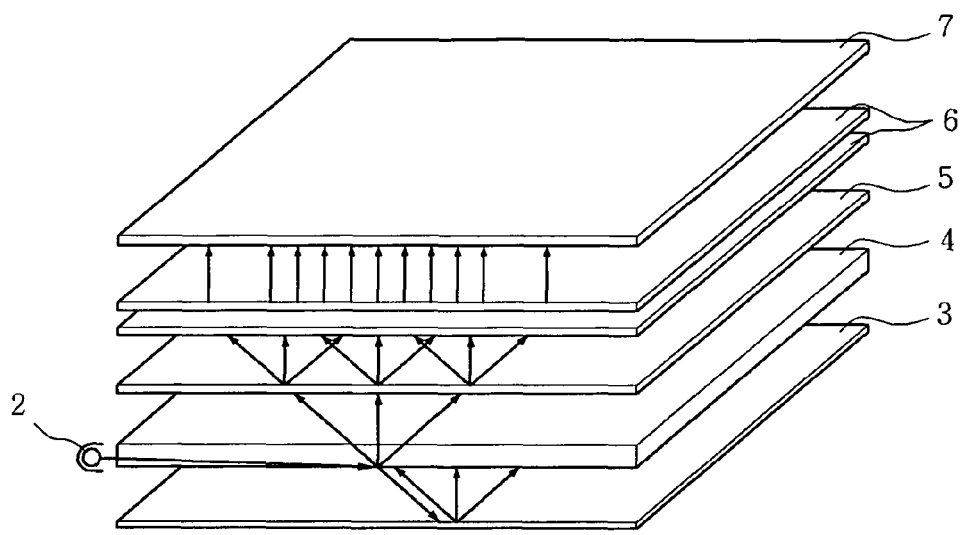
FIG. 8 is a sectional-view illustrating the structure of a back light unit using a conventional wedge-type light guide plate.

Table 2 shows results of Experimental Examples 1 to 8 and Comparative Examples 1 and 2. FIG. 7 is a graph showing the brightness according to Experimental and Comparative Examples of embodiments of the present invention.

It can be seen from Table 2 and FIG. 7 that Experimental Examples, under the condition that a ratio of lens height to lens pitch is lower than 0.23, exhibited high central brightness, and that all of Experimental Examples showed excellent pattern visibility, as compared to Comparative Examples. It can be also confirmed that when comparing both pattern visibility and brightness between Experimental and Comparative Examples, Experimental Examples 5 and 6 were the best.

These results ascertained it is preferable that a ratio of pitch to height of the respective optical members arranged on the front surface of the light guide plate is in the range of 1:0.1 to 1:0.35, an angle between the adjacent optical members is in the range of 60° to 120°, and the curvature radius of each optical member is in the range of 0.5- to 1.2 folds of the pitch of each lens.

As apparent from the above description, with the light guide plate according to Experimental Examples of the embodiments of the present invention, it is possible for the liquid crystal display device of an embodiment of the present invention to obtain substantially the same effects as that of the conventional liquid crystal display device without employing a prism sheet which are used in the back light unit of the conventional liquid crystal display device. That is to say, the use of the light guide plate according to an embodiment of the present invention eliminates the necessity of one or two prism sheets among a variety of sheets which are applied to the conventional back light unit.

Example embodiments have been disclosed herein, and although specific terms are employed, they are used in and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A light guide plate for a liquid crystal display device, comprising:
   side surfaces on which light is incident;
   a front surface from which the light is emitted, the front surface connected to the side surfaces; and
   a rear surface on which the light is reflected,
   wherein the rear surface is formed with a main prism portion, including a plurality of prisms, each having a longitudinal direction perpendicular to a direction of light emitted from a light source, and the front surface is formed with a front-lens part, including a plurality of optical members, each having a half-oval cross-section, the half-oval cross-section of each optical member having a ratio of pitch to height in the range of 1:0.1 to 1:0.35.

2. The light guide plate as claimed in claim 1, wherein the optical members are lenticular lenses.

3. The light guide plate as claimed in claim 1, wherein the optical members are microlenses.

4. The light guide plate as claimed in claim 1, wherein the optical members have a pitch of 10 to 250 μm.

5. The light guide plate as claimed in claim 1, wherein an angle between the adjacent optical members is in the range of 60° to 120°.

6. The light guide plate as claimed in claim 1, wherein the curvature radius of each optical member is in the range of 0.5- to 1.2 folds of the pitch of each lens.

7. The light guide plate as claimed in claim 2, wherein an angle defined between the longitudinal direction of each lenticular lens and the longitudinal direction of each prism constituting the main prism part is in the range of 80 to 100°.

8. The light guide plate as claimed in claim 1, wherein the main prism part is in the form of a stripe-pattern increasing in width along with an increase in a distance from the side surface on which light is incident.

9. The light guide plate as claimed in claim 1, wherein the main prism part is in the form of a dot-pattern increasing in density along with an increase in a distance from the side surface on which light is incident.

10. A back light unit for a liquid crystal display device, comprising:
    the light guide plate as claimed in claim 1; and
    a light source arranged on one or both sides of the light guide plate.

11. A liquid crystal display device, comprising:
    the light guide plate as claimed in claim 1; and
    a light source arranged on one side of the light guide plate.

12. The light guide plate as claimed in claim 5, wherein the curvature radius of each optical member is in the range of 0.5- to 1.2 folds of the pitch of each lens.

13. A liquid crystal display device, comprising:
    the light guide plate as claimed in claim 12; and
    a light source arranged on one side of the light guide plate.

14. A light guide plate for a liquid crystal display device, comprising:
    side surfaces on which light is incident;
    a front surface from which the light is emitted, the front surface connected to the side surfaces; and
    a rear surface on which the light is reflected,
    wherein the rear surface is formed with a main prism portion, including a plurality of prisms, each having a longitudinal direction perpendicular to a direction of light emitted from a light source, and the front surface is formed with a front-lens part, including a plurality of optical members, each having a half-oval cross-section, wherein an angle between the adjacent optical members is in the range of 60° to 120°.

15. A liquid crystal display device, comprising:
    the light guide plate as claimed in claim 14; and
    a light source arranged on one side of the light guide plate.

16. The light guide plate as claimed in claim 14, wherein the curvature radius of each optical member is in the range of 0.5- to 1.2 folds of the pitch of each lens.

17. A light guide plate for a liquid crystal display device, comprising:
    side surfaces on which light is incident;
    a front surface from which the light is emitted, the front surface connected to the side surfaces; and
    a rear surface on which the light is reflected,
    wherein the rear surface is formed with a main prism portion, including a plurality of prisms, each having a longitudinal direction perpendicular to a direction of light emitted from a light source, and the front surface is formed with a front-lens part, including a plurality of optical members, each having a half-oval cross-section, wherein the curvature radius of each optical member is in the range of 0.5- to 1.2 folds of the pitch of each lens.

18. A liquid crystal display device, comprising:
    the light guide plate as claimed in claim 17; and
    a light source arranged on one side of the light guide plate.

19. A light guide plate for a liquid crystal display device, comprising:
    side surfaces on which light is incident;
    a front surface from which the light is emitted, the front surface connected to the side surfaces; and
    a rear surface on which the light is reflected,
    wherein the rear surface is formed with a main prism portion, including a plurality of prisms, each having a longitudinal direction perpendicular to a direction of light emitted from a light source, and the front surface is formed with a front-lens part, including a plurality of optical members, each having a half-oval cross-section, wherein the optical members are lenticular lenses and an angle defined between the longitudinal direction of each lenticular lens and the longitudinal direction of each prism constituting the main prism part is in the range of 80 to 100°.

20. A liquid crystal display device, comprising:
    the light guide plate as claimed in claim 19; and
    a light source arranged on one side of the light guide plate.

* * * * *